Dec. 28, 1965  H. J. STEINBACH  3,225,835
PASTURE CONDITIONER
Original Filed March 6, 1962  2 Sheets-Sheet 1
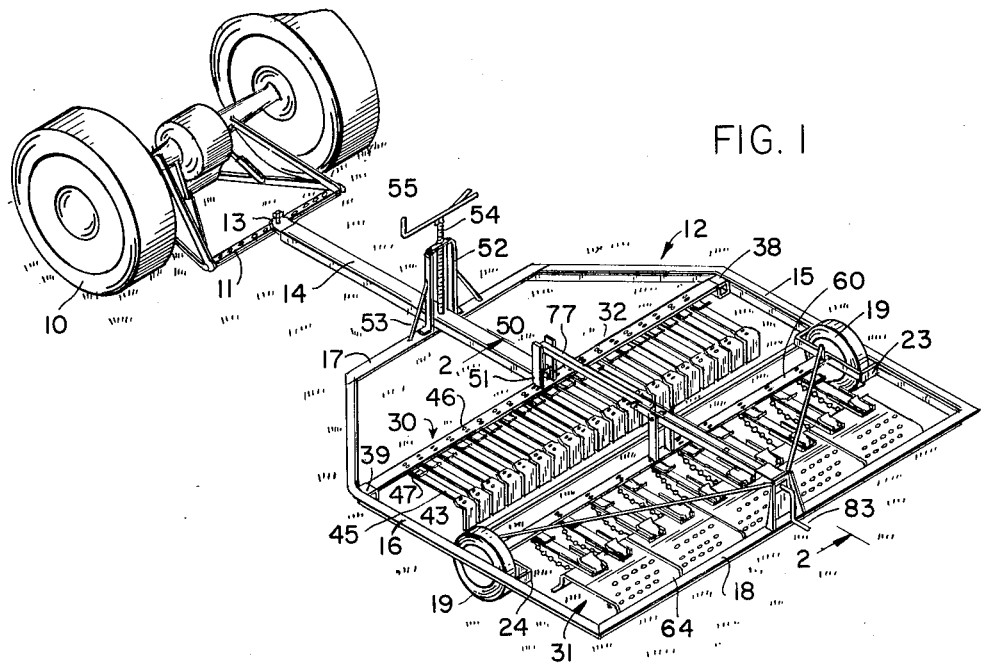
FIG. 1
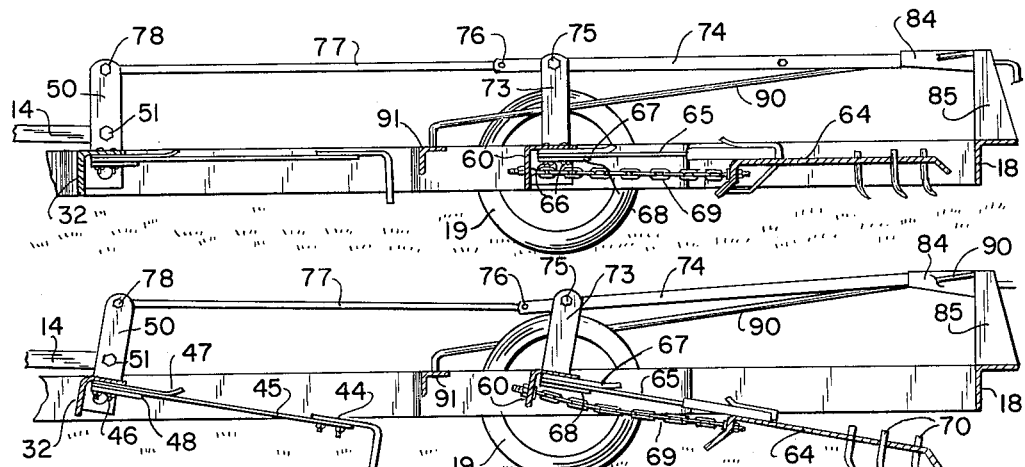
FIG. 2
FIG. 3
INVENTOR
HERMANN STEINBACH
BY *Ayates Dowell* 
ATTORNEYS Dec. 28, 1965     H. J. STEINBACH     3,225,835
PASTURE CONDITIONER
Original Filed March 6, 1962     2 Sheets-Sheet 2

INVENTOR
HERMANN STEINBACH

BY *Ayars Dowell I & II*
ATTORNEYS

United States Patent Office 3,225,835
Patented Dec. 28, 1965

3,225,835
PASTURE CONDITIONER
Hermann J. Steinbach, Lancaster, Pa.
(25 Keith Ave., Barre, Vt.)
Continuation of application Ser. No. 178,025, Mar. 6, 1962. This application Dec. 15, 1964, Ser. No. 434,727
6 Claims. (Cl. 172—138)
(Filed under Rule 47(b) and 35 U.S.C. 118)

This application is a continuation of Serial No. 178,025 filed March 6, 1962, now abandoned, and relates to fertilizer distributors and other surface treating equipment by means of which fertilizer or other material may be scattered and the earth treated to place it in condition to absorb the fertilizer or substance distributed.

The invention relates particularly to a pasture conditioner or device which can be attached to another vehicle and drawn over an area to be treated for spreading fertilizer or the like and for breaking up or otherwise agitating the soil for maximum accomplishment in the promotion of growth over such area.

Fertilizer distributors or earth working devices of various kinds have been produced with varying degrees of suitability for the uses required, and these devices have been subject to criticism not only due to the fact that they did not accomplish all that was desired, but they were expensive, cumbersome, lacked the necessary sturdiness and durability and were time and labor consuming.

It is an object of the invention to provide a practical combination fertilizer spreader and soil conditioner capable of being readily produced, attached to the drawbar of a drawing vehicle and operated over the surface of the soil to accomplish the desired results with a minimum of effort, time and labor.

Another object of the invention is to provide a vehicle for treating the surface of the earth having a plurality of groups of implements which may be raised and lowered simultaneously and which may be selectively disposed in contact with the earth either independently or in combination and under varying amount of tension.

Still another object of the invention is to provide a vehicle for treating the surface of the earth including a frame and an elongated tongue and providing means for adjusting the angularity of the tongue relative to the frame and adjusting the angularity of the frame relative to the earth.

Figure 4:
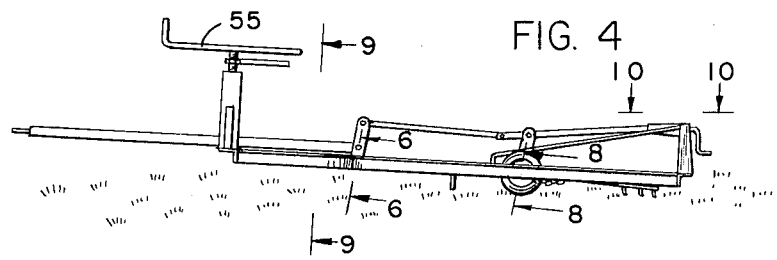
Figure 5:
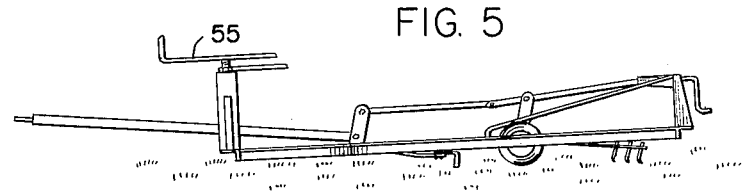
Figure 6:
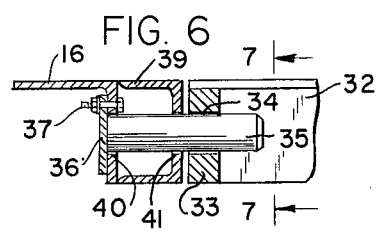
Figure 7:
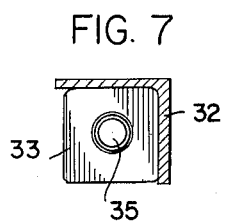
Figure 9:
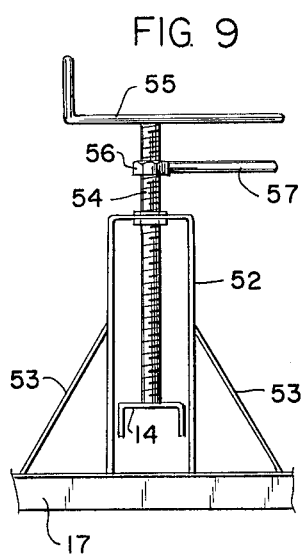
Figure 8:
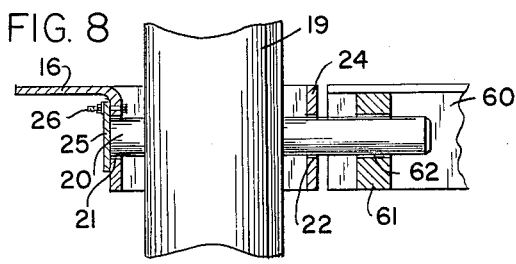
Figure 10:
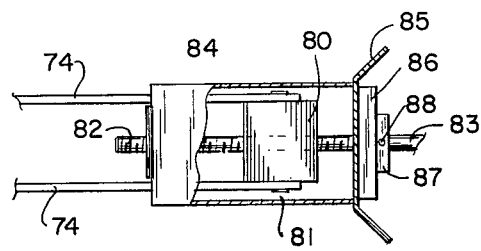

Other objects and advantages of the invention will be apparent from the following description taken in conjunction with the accompanying drawings wherein:

FIG. 1 is a perspective illustrating one application of the invention;
FIG. 2, a section on the line 2—2 of FIG. 1;
FIG. 3, a section similar to that of FIG. 2 in operative position to engage the earth;
FIG. 4, a side elevation illustrating the frame adjustment with the rear gang engaging the earth;
FIG. 5, a side elevation illustrating the frame adjustment with forward gang engaging the earth;
FIG. 6, a section on the line 6—6 of FIG. 4;
FIG. 7, a section on the line 7—7 of FIG. 6;
FIG. 8, a section on the line 8—8 of FIG. 4;
FIG. 9, a section on the line 9—9 of FIG. 4, and
FIG. 10, a fragmentary section on the line 10—10 of FIG. 4.

Briefly stated the present invention includes a trailer adapted to be connected to a propelling vehicle such as a tractor and such trailer includes a frame and front and rear gangs of earth working implements. Means is provided for simultaneously raising and lowering the implements carried by said frame and additional means is provided for regulating the angularity of the frame relative to the earth so that such implements can be selectively disposed in engagement with the earth either independently or in combination.

With continued reference to the drawings, a conventional tractor 10 has a drawbar 11 to which a trailer having a frame 12 can be attached in any desired manner as by a hitch 13 on one end of an elongated tongue 14. The frame 12 is generally rectangular and includes side members 15 and 16 connected by front and rear members 17 and 18 respectively. A pair of earth engaging wheels 19 are mounted on stub shafts 20 carried by the side members 15 and 16 intermediate the ends thereof. The shafts 20 extend through openings 21 in the members 15 and 16 and through openings 22 in wheel guards 23 and 24 disposed on opposite sides of the frame and connected to the side members 15 and 16 respectively, for a purpose which will be described later. One end of each of the shafts 20 is welded or otherwise secured to a plate 25 which is attached to the side members 15 and 16 by fasteners 26 to prevent relative rotation between the shafts 20 and the wheel 19.

The frame 12 pivotally supports front and rear gangs of earth working implements 30 and 31 which may be adjusted so that the gangs may be operated either independently or simultaneously. The gang 30 includes a cross bar 32 of angle iron construction having blocks 33 at the opposite ends thereof with openings 34 for the reception of stub shafts or pins 35 about which the cross bar 32 is pivotally mounted. One end of each of the pins 35 is welded or otherwise attached to a plate 36 fixed to the side members 15 and 16 by fasteners 37 to prevent relative rotation between the pins and the frame. In order to support the other end of the pins 35, the side members 15 and 16 are provided with spacers 38 and 39 respectively and to accommodate the pins the side members are provided with openings 40 and the spacers are provided with openings 41 in which the pins are slidably received.

The cross bar 32 supports a plurality of metal strips or teeth 43 of angular construction with the lower portion of such teeth relatively wide and flat and spaced close together with a small opening between the adjacent teeth. The upper flange of each of the teeth 43 is connected by fasteners 44 to a leaf spring 45, the opposite end of which is connected to the cross bar 32 by fasteners 46.

In order to control the flexibility of the leaf spring 45, a tension plate 47 is located between the cross bar 32 and the leaf spring 45 to exert pressure on the bending moment of the leaf spring when the teeth are in engagement with the earth. A plate 48 is disposed beneath each of the leaf springs 45 to strengthen the connection between the leaf spring and the cross bar 32, with such plate 48 and the tension plate 47 being mounted in relation with the cross bar 32 by the fasteners 46.

A yoke 50 is mounted centrally of the upper surface of the cross bar 32 and such yoke pivotally receives the tongue 14 by means of a pin 51. The angularity of the tongue 14 is controlled relative to the frame 12 by a U-shaped yoke 52 mounted on the front member 17 of the frame and such yoke being supported by braces 53. A lead screw 54 is threadedly received within the upper or bight portion of the U-shaped yoke 52 and such lead screw is adapted to be rotated by a crank or operating rod 55 welded or otherwise attached thereto. A lock nut 56 having an operating handle 57 is mounted on the lead screw 54 between the yoke and the operating rod by which the lead screw may be locked in adjusted position.

The rear implement gang 31 comprises a cross bar 60 having a block 61 welded or otherwise attached to each end thereof and such blocks are provided with openings 62 which pivotally receive the stub shafts 20 and permit rotation of the cross bar 60 about such shafts. A plurality of plates 64 are connected to the cross bar 60 by flexible members or leaf springs 65. The leaf springs 65 are connected to the cross bar 60 by fasteners 66 and the bending moment of such leaf spring is controlled by a tension plate 67 and such connection is strengthened by a plate 68 similar to the connection of the front gang 30.

If desired, a safety chain 69 may be connected at one end to the cross bar 60 and at the opposite end of the leading edge of the plates 64, one of such chains being provided for each of the flexible members 65. The plates 64 receive a plurality of spikes or teeth 70 having an offset lower end 71 for engaging the earth and creating furrows or shallow valleys to thoroughly distribute fertilizer to the root system of the growth in the pasture as well as to prepare the earth therefor.

An upright yoke 73 is mounted centrally of the cross bar 60 and is adapted to receive a pair of arms 74 pivotally mounted on such upright by a pin 75. The forward end of the arms 74 which extend beyond the yoke 73 are pivotally connected by a pin 76 to a connecting bar 77, the opposite end of which is pivotally connected by a pin 78 to the yoke 50 of the gang 30.

In order to move the gangs 30 and 31 out of the plane of the frame 12, the rear ends of the arms 74 are connected to a block 80 by fasteners 81. The block 80 threadedly receives one end 82 of a crank 83 so that upon rotation of such crank the sliding block 80 will move either forwardly or rearwardly to pivot the gangs 30 and 31 about the pins 35 and 20, respectively.

The block 80 is retained within a housing 84 mounted on an upright support 85 carried by the rear frame member 18 and such support is provided with a bearing plate 86 against which a collar 87 mounted on the crank 83 by a set screw or other fastener 88 is adapted to rest. The upright support 85 is connected by braces 90 to a fixed cross bar 91 which extends between and is connected to the wheel guards 23 and 24.

In the operation of the device the frame is normally disposed generally parallel to the ground and the block 80 is moved toward the forward portion of the housing 84 so that the implements are in raised position when the trailer is moved from one field to another. When the trailer reaches the field or pasture to be conditioned, the crank 83 is operated to move the block 80 toward the rear of the frame and simultaneously pivot both groups of implements downwardly. If it is desired that both groups of implements be engaging the ground simultaneously, the crank 83 is operated until such time as the cross bars 32 and 60 have been rotated sufficiently to cause the implements to engage the earth. The amount of tension on the implements can be adjusted by rotation of such crank. If only one group of implements are to be in engagement with the ground, the crank 83 is rotated until both groups of implements are moved downwardly so that they are adjacent to but not touching the ground. Thereafter the operating lever 55 may be operated in either direction to change the angular position of the frame relative to the ground and cause such frame to be pivoted about the axles 20 and the ground engaging wheels 19. If it is desired that the front gang of implements be in engagement with the earth, the operating lever 55 will be operated to raise the lead screw 54 and thereby lower the forward portion of the frame 12 until the front implements are in engagement with the ground. Conversely, operation of the lever 55 to move the lead screw 54 into the yoke 82 will raise the forward portion of the frame to an elevation higher than the axles 20 so that the rear gang of implements are in engagement with the ground.

It will be apparent that when the trailer is being moved from one location to another the adjustment should be such that neither implement will engage the earth and that upon reaching its destination either or both of the gangs may be adjusted to engage the earth in order to perform their various functions.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A pasture conditioner for spreading fertilizer and breaking the soil to encourage growth in a field comprising a frame, ground engaging wheels supporting said frame intermediate the ends thereof, a pair of cross bars pivotally carried by said frame intermediate the ends thereof, an elongated tongue pivotally connected at one end to one of said cross bars, yoke means mounted on the front of said frame, adjustable means carried by said yoke means and engageable with said tongue for controlling the angular relation between said tongue and said frame, a gang of implements mounted on each of said cross bars, one gang of implements being located forwardly of said wheels and one gang of implements being located rearwardly of said wheels, and adjustable means for rotating said cross bars simultaneously for raising and lowering said implements, whereby either or both groups of implements can be selectively moved into engagement with the earth or out of engagement therewith.

2. The structure of claim 1 including a flexible member connecting said implements to said cross bars.

3. The structure of claim 1 in which said adjustable means for rotating said cross bars simultaneously includes a first link means pivotally connected to one of said cross bars, a second link means pivotally connected to the other cross bar, said first and second link means being pivotally connected together, and crank means threadedly engaging one end of said second link means, whereby rotation of said crank means will move said link means longitudinally to rotate said cross bars.

4. A pasture conditioner comprising a frame including generally parallel side members connected by front and rear end members, ground engaging wheels supporting said frame intermediate the ends thereof, multiple cross bars pivotally mounted on said side members, an elongated tongue pivotally mounted at one end to one of said cross bars, means connecting the opposite end of said tongue to a propelling vehicle, adjustable means mounted on said front end member and engageable with said tongue for controlling the angular relation between said tongue and said frame, at least one implement mounted on each of said cross bars, one of said implements being located forwardly of said wheels and one of said implements being located rearwardly of said wheels, link means connecting said cross bars, and adjustable means mounted on said frame and connected to said link means for rotating said cross bars simultaneously and raising and lowering said implements, whereby either or both implements can be independently or collectively moved into engagement with the earth or out of engagement therewith.

5. A pasture conditioner for use with a propelling vehicle to spread fertilizer and break the soil to encourage growth in a field comprising an elongated frame constructed of generally parallel side members connected by front and rear end members, a wheel guard mounted on each side member intermediate the ends and substantially in alignment with each other, an axle removably mounted on each side member and extending through said wheel guards with a free end disposed inwardly thereof, a ground-engaging wheel freely rotatably mounted on each axle between said side members and said wheel guards, a pivot pin mounted on each side member substantially in alignment with each other and in spaced relation with said axles with free ends projecting inwardly toward the center of said frame, a first cross bar pivotally mounted on the free ends of said pivot pins, a second cross bar pivotally mounted on the free ends of said axles, a gang of earth-working implements mounted on each of said cross bars, each gang being connected at one end to the cross bar and extending rearwardly thereof, a pair of upstanding members fixed to the upper central portion of each of said cross bars, an elongated tongue pivotally connected at one end between the upstanding members of said first cross bar and connectable at the opposite end to the propelling vehicle, an inverted U-shaped yoke member mounted on said front end member, a lead screw threadedly carried by said yoke member and engageable with said tongue intermediate the ends thereof, an upright support fixed to said rear end member, a housing connected to said upright support and having a block slidably mounted therein, a crank having one end disposed within said housing and threadedly engaging said block, a link pivotally connected to the upstanding members of said first cross bar, a pair of arms pivotally connected to the opposite end of said link, the opposite ends of said arms being pivotally connected to said block within said housing, the upstanding members of said second cross bar being pivotally connected to said arms intermediate the ends thereof, whereby movement of said crank will extend or retract said block to cause said first and second cross bars to pivot about said pivot pins and said axles respectively to move the gangs of implements into and out of engagement with the soil, and movement of said lead screw will alter the angularity of said tongue relative to said frame so that either or both gangs of implements can be moved into or out of engagement with the soil individually or simultaneously.

6. A pasture conditioner for use with a propelling vehicle to spread fertilizer and break the soil to encourage growth in a field comprising an elongated frame constructed of generally parallel side members connected by front and rear end members, a pair of axles mounted one on each of said side members substantially in alignment with each other and extending inwardly toward the center of said frame, a ground-engaging wheel freely rotatably mounted on each axle, a pivot pin mounted on each side member substantially in alignment with each other and in spaced relation with said axles and said front member, a first cross bar pivotally mounted on said pivot pins, a second cross bar pivotally mounted on said axles, a gang of resiliently mounted earth-working implements carried by each of said cross bars, each gang being connected at one end to the cross bar and extending rearwardly thereof, at least one upstanding member fixed to the central portion of each cross bar, an elongated tongue pivotally connected at one end to the upstanding member of said first cross bar and connectable at the opposite end to the propelling vehicle, an inverted U-shaped yoke member mounted on said front end member adjacent to said tongue, screw means threadedly carried by said yoke member and engageable with said tongue intermediate the ends thereof, an upright support fixed to said rear end member, a crank rotatably carried by said support and having threads along one end, a block threadedly engageable with said frame, and link means pivotally connecting said block and said upright members on said cross bars whereby movement of said crank will extend or retract said block to cause said first and second cross bars to pivot about said pivot pins and said axles respectively to move the gangs of implements toward and away from the soil and movement of said lead screw will alter the angularity of said frame relative to said tongue and the angularity of said tongue relative to the soil so that either or both gangs of implements can be moved into or out of engagement with the soil individually or simultaneously.

References Cited by the Examiner

UNITED STATES PATENTS

| 1,352,783 | 9/1920 | Cox et al. | 172—323 X |
| 1,535,887 | 4/1925 | Altgelt et al. | 172—323 |
| 2,719,393 | 10/1955 | Bowersox | 172—678 X |

FOREIGN PATENTS 987,717  4/1951  France.

ABRAHAM G. STONE, *Primary Examiner.*

M. C. PAYDEN, *Assistant Examiner.*